(12) United States Patent
Hedlund

(10) Patent No.: US 6,446,668 B2
(45) Date of Patent: Sep. 10, 2002

(54) MULTIWAY VALVE

(75) Inventor: Staffan Hedlund, Skarholmen (SE)

(73) Assignee: AB Rexroth Mecman, Stockholm (SE)

( * ) Notice: Subject to any disclaimer, the term of this patent is extended or adjusted under 35 U.S.C. 154(b) by 0 days.

(21) Appl. No.: 09/808,394

(22) Filed: Mar. 14, 2001

(30) Foreign Application Priority Data

Mar. 17, 2000 (DE) ........................................ 100 14 906

(51) Int. Cl.[7] ............................................ F15B 13/043
(52) U.S. Cl. .............. 137/625.64; 137/271; 137/625.66
(58) Field of Search ........................... 137/271, 625.64, 137/625.66

(56) References Cited

U.S. PATENT DOCUMENTS

| 3,227,180 A | * | 1/1966 | Tissot-Dupont ........ | 137/625.66 |
| 4,515,184 A | * | 5/1985 | Bownass et al. ....... | 137/625.66 |
| 4,524,803 A | * | 6/1985 | Stoll et al. ............. | 137/625.66 |

FOREIGN PATENT DOCUMENTS

| DE | 2300644 | * | 7/1974 | ............ 137/625.66 |
| DE | 93 04 522.0 | | 7/1993 | |
| DE | 197 06 059 | | 8/1998 | |
| WO | WO 95/03493 | | 2/1995 | |

* cited by examiner

Primary Examiner—Gerald A. Michalsky
(74) Attorney, Agent, or Firm—Reed Smith LLP; Michael I. Wolfson

(57) ABSTRACT

A multiway valve for switching the fluid flow of a pressure medium comprising a valve housing (1) with several ports (2a, 2b, 3a, 3b, 4a, 4b) for the pressure medium which are connected with an inner valve hole (5) in which a valve spool (6) for switching the fluid flow between said ports (2a, 2b, 3a, 3b, 4a, 4b) is slidely disposed, and which comprises at least one cap element (7a, 7b) for sealing said valve hole (5) on at least one end side, at least one piston (11) for axially moving said valve spool (6) in a desired switching position which corresponds with a drive chamber (12) formed in the end section of the valve hole (5) to and from which a control fluid is supplied and ejected respectively in order to move said piston (11), wherein said at least one cap element (7a, 7b) comprises at least one through bore (18a, 18b; 25) which in the mounted state of the cap element (7a, 7b) is substantially disposed in a right angle to the axis of the valve hole (6), and wherein said through bore (18a, 18b; 25) corresponds with a second through bore (18) in the valve housing and also with a bore (19; 22) in a tight-fitting support element in order to fix the cap element (7a, 7b) to the valve housing (1) and to fix the valve housing (1) to the support element by the same fixing means.

12 Claims, 4 Drawing Sheets

MULTIWAY VALVE

FIELD OF THE INVENTION

This invention relates to a multiway valve for switching the fluid flow of a pressure medium. Especially, the present invention relates to a multiway valve with a valve spool slidingly disposed inside a valve hole which is sealed by at least one cap element.

DESCRIPTION OF RELATED ART

A multiway valve is known from DE 197 06 059 A1. The multiway valve comprises a valve hole lengthwise disposed inside the valve housing in which a valve spool is slidingly operated. The valve housing has five outer ports which are connected with the inner valve hole. The fluid flow through the multiway valve depends on the axial position of the valve spool relative to the valve hole. For example, the two-position multiway valve provides in one switching position a supply of a connected fluid apparatus. The other switching position of the valve spool provides an ejecting of said apparatus.

For moving the valve spool in an axial manner in order to control the fluid flow through the valve one end of the valve spool is formed as a piston. The piston works together with cylindrical drive chambers integrated into the valve housing at the end of the valve hole so that the switching position of the valve spool is controllable by air pressure. A return spring disposed on the opposite side of the valve spool's operating piston forces the valve spool back to its normal position.

A known three-position multiway valve differs from said two-position multiway valve in a manner that one spring is disposed at each side of the valve spool in order to centre the valve spool in the third position. Thus this three-position multiway valve provides—for example—in one switching position a supply of a connected fluid apparatus. The other switching position of the valve spool provides an ejecting of said apparatus. In the neutral switching position the multiway valve seals off the fluid flow through the valve housing.

In order to seal the openings of the valve hole on both ends of the valve housing a respective cap element is fixed to the valve housing. The fixing means are several screws which are screwed into the valve housing parallel to the axis of the valve hole. To connect the multiway valve on a support element, e.g. a fluid manifold, further fixing means are needed.

SUMMARY OF THE INVENTION

It is the aim of the present invention to provide an integrated fixing solution for parts of a multiway valve.

This aim is obtained by a multiway valve wherein the cap element which seals the valve hole in the valve housing comprises at least one through bore or opening which is substantially disposed in a right angle to the axis of the valve hole in the mounted state of the cap element. Said through bore corresponds with a second through bore in the valve housing and also with a bore in a tight-fitting support element in order to fix the cap element on the valve housing and to fix the valve housing on the support element by the same fixing means.

Thus the present invention provides an integrated fixing solution for parts of a multiway valve which reduce the valve size. It is not necessary to fix a cap element by separate fixing means. The invention also reduces the time for mounting the multiway valve.

Preferably, the fixing means are at least one screw which is screwed into the bore of a tight-fitting support element. It is also possible to use other suitable fixing means, like bolts or rivets. It might be favourable when the fixing means comprise further screws which are disposed on at least one side of the central screw in order to fix the valve housing on the same or a further support element.

The support element can be a fluid manifold of a valve bank for connecting the valve housing with supplying and/or ejecting channels. It is also possible that the support element is an upper port module for connecting the valve housing with pilot valves. Moreover, an additional linking part to the support element might be disposed next to the valve housing fixed by the fixing means. In one preferred embodiment the multiway valve comprises two drive chambers with corresponding pistons which are disposed on both ends of the valve spool in order to provide a bi-stable two-position valve function. In another preferred embodiment two return springs and two pistons are disposed on each end of the valve spool which correspond with respective drive chambers in order to provide a mono-stable three-position valve function. Moreover, the present invention is applicable in further embodiments of a multiway valve which realise various valve functions. Especially, the present invention is applicable in a multiway valve with a solenoid as drive unit for the valve spool.

It might be favourable when the spring chamber has the same form as the drive chamber so that the return spring is interchangeable by a piston in order to change the valve function. Referring to the form of the corresponding cap element, its outer diameter is adapted to the inner diameter of the drive chamber.

The foregoing and other aspects will become apparent from the following detailed description of the invention when considered in conjunction with the enclosed drawings.

DESCRIPTION OF THE PREFERRED EMBODIMENTS

Figure 1:
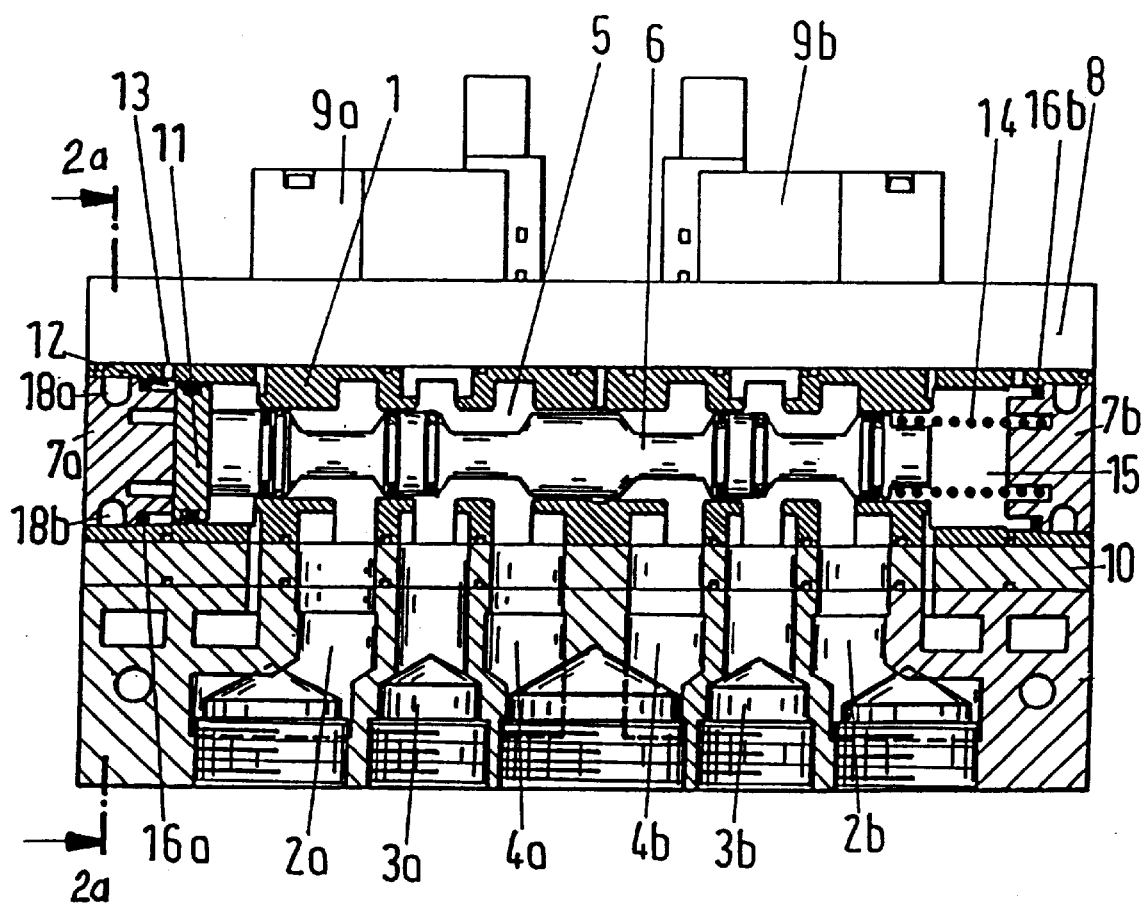
FIG. 1 shows a cross-section view of a two-position multiway valve in its normal position.

The mono-stable two-position multiway valve shown in FIG. 1 comprises a valve housing 1 with six outer ports 2 to 4 for the pressure medium. The ports 2a and 2b are supplying ports (P). The ports 3a and 3b provide a connection to delivery conducts (A, B). The ports 4a and 4b act as ejecting ports (EA, EB).

These ports 2 to 4 are connected with an inner valve hole 5 in which a valve spool 6 is slidingly disposed for switching the fluid flow between said ports 2 to 4. The valve hole 5 is sealed by two cap elements 7a and 7b disposed on the respective end sides of the valve housing 1. The valve assembly is completed by an upper port module 8 disposed between the upper side of the valve housing 1 and two pilot valves 9a and 9b. The valve housing 1 is mounted on a (not shown) fluid manifold as support element. Between the fluid manifold and the valve housing 1 a lower port module is disposed, which is connected to the valve housing over a linking part 10. It is—of course—also possible to mount the valve housing 1 directly to the fluid manifold.

One end section of the valve spool 6 is provided with a piston 11 for axially moving said valve spool 6 in a desired switching position. The piston 11 corresponds with a drive chamber 12 formed in the valve hole 5 to and from which a control fluid is supplied and ejected respectively through the opening 13 in order to move said piston 11.

Furthermore, a return spring 14 for returning the valve spool 6 into its normal position is disposed inside a spring chamber 15 between the cap element 7b and the valve spool 6. The outer diameter of the cap element 7a, 7b is adapted to the inner diameter of the drive chamber 12 and the spring chamber 15. The cap element 7a, 7b is provided with an annular sealing element 16a, 16b disposed in a groove on the outer surface of the cap element 7a, 7b in order to provide an air-tight sealing to the valve housing 1.

The two-position multiway valve is shown in its neutral position wherein the return spring 14 is not compressed and the drive chamber 12 is ejected so that fluid flows from port 3a to port 4a for ejecting and from port 2b to port 3b for supplying. If the drive chamber 12 is under pressure in order to move the valve spool 8 into its operating position wherein the return spring 14 is compressed, the fluid flows from port 2a to port 3a for supplying and from port 3b to port 4b for ejecting.

Figure 2A:
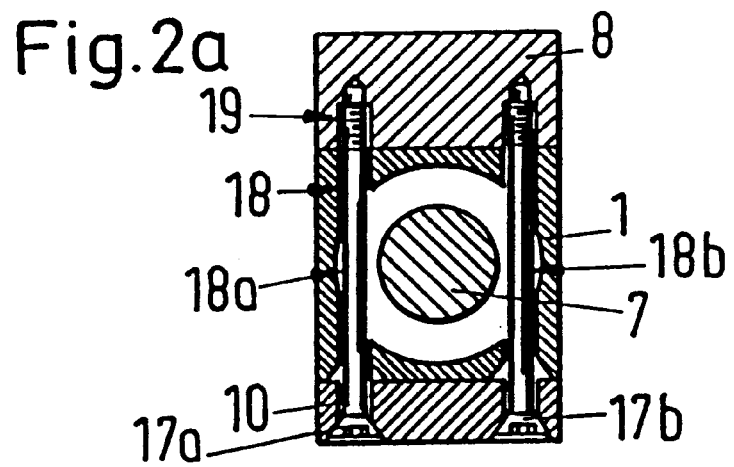
FIG. 2a to 2c show various preferred embodiments of the fixing means in an A—A view of the FIG. 1.
Figure 2B:
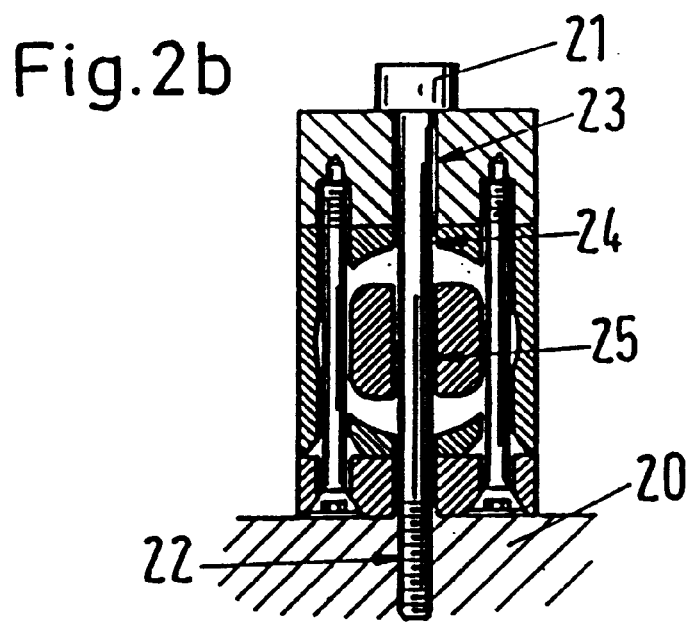
Figure 2C:
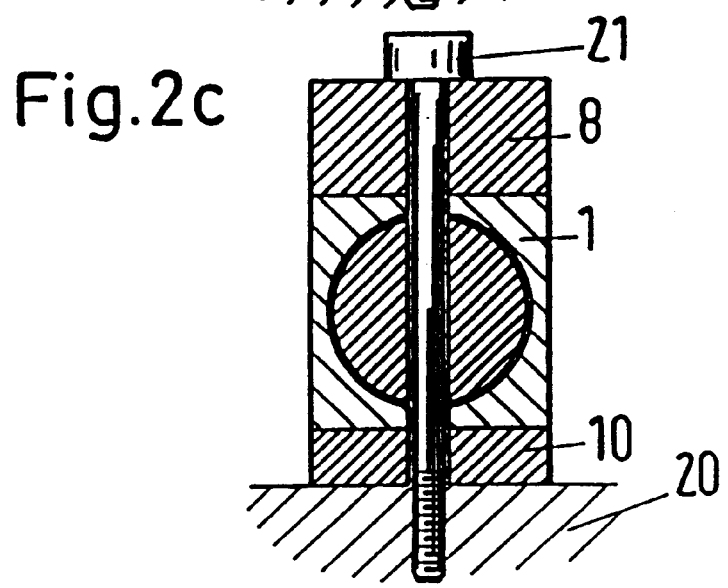

FIGS. 2a to 2c show the end section of the valve housing 1. FIG. 2a shows the cap element 7 fixed to the upper port module 8 as support element by two screws 17a and 17b going from the linking part 10 through bores 18 into the valve housing 1 and through bores 18a and 18b through the cap element 7. The screws 17a and 17b are screwed into bores 19 disposed in the upper port module 8. It is also possible to fix the valve housing 1 to the upper port module 8 without the linking part 10.

FIG. 2b shows another embodiment wherein the support element is a fluid manifold 20 of a valve bank for connecting the valve housing 1 with supplying and/or ejecting channels. To fix the valve housing 1 onto the fluid manifold 20 a central screw 21 is provided which goes through a bore 23 in the upper port module 8 and through a central bore 24 in the valve housing 1 and also through a central bore 25 in the cap element 7. The central screw 21 is screwed into a bore 22 of the fluid manifold 20.

In the embodiment shown in FIG. 2c only the central screw 21 is used to fix the valve housing 1 together with the upper port module 8 and the linking part 10 onto the fluid manifold 20 as support element.

Figure 3:
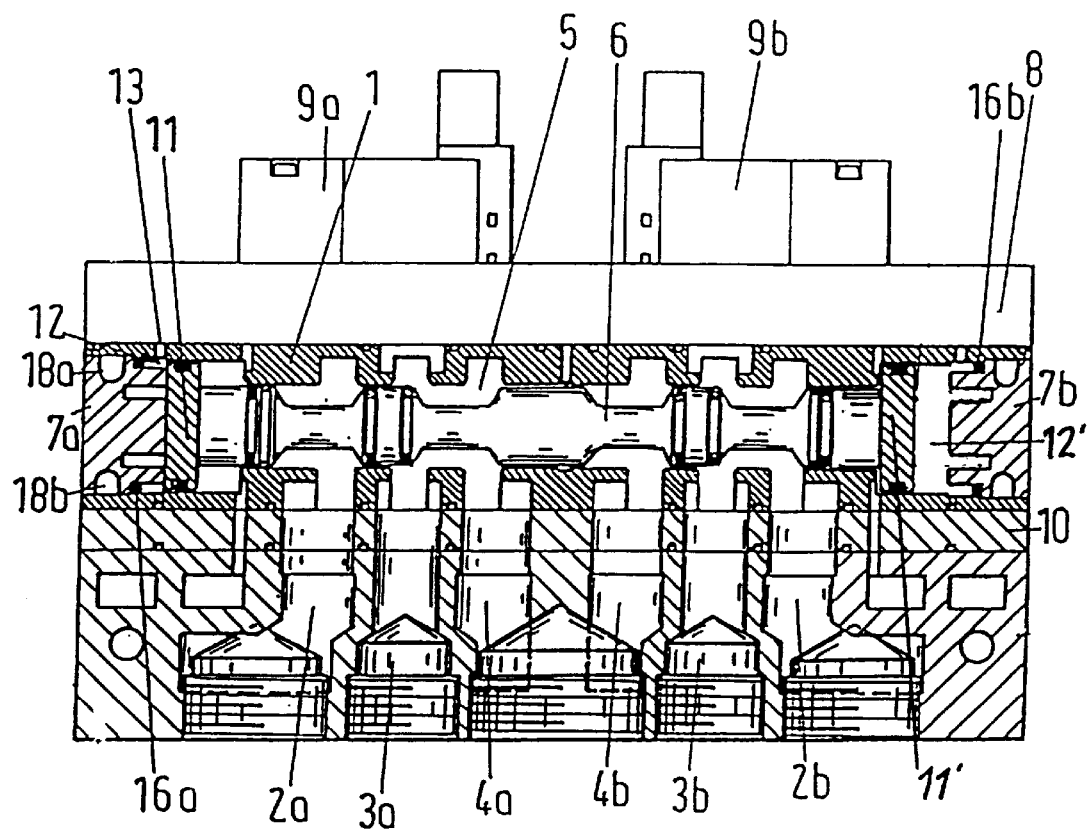
FIG. 3 is a cross-sectional view of the valve of FIG. 1 with two drive chambers with corresponding pistons.
Figure 4:
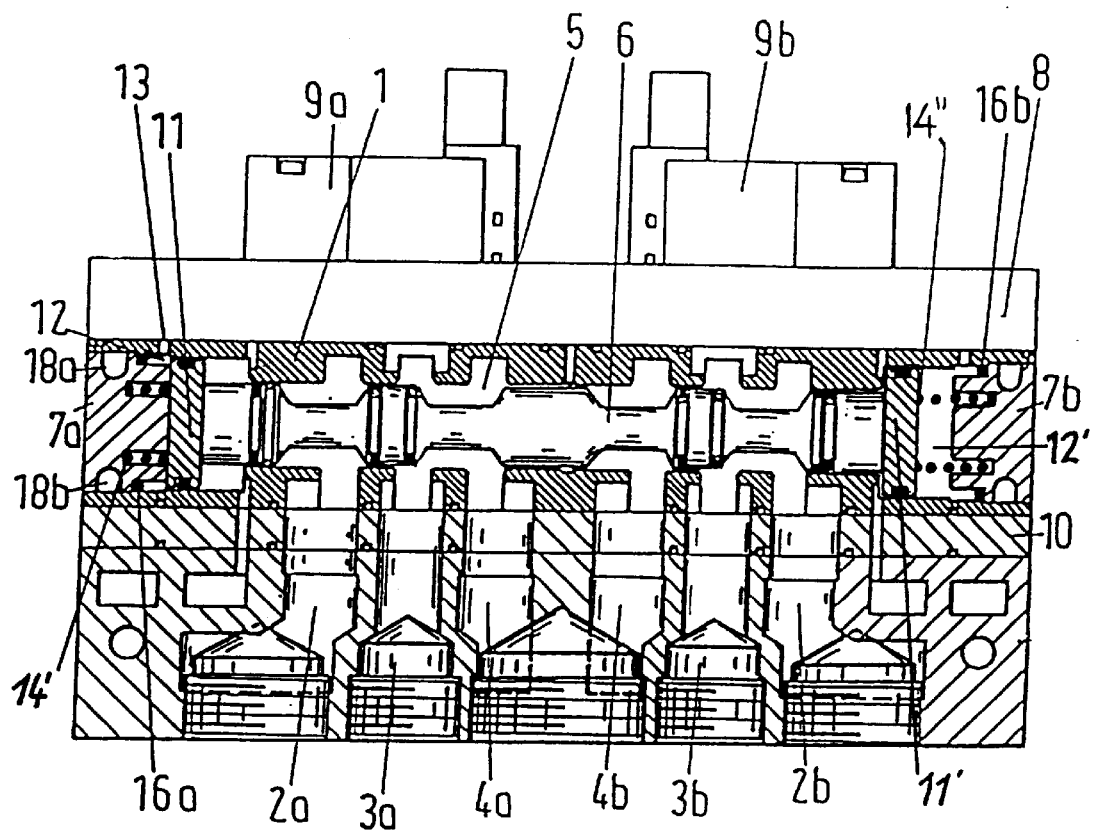
FIG. 4 is a cross-sectional view of the valve of FIG. 3 with two return springs positioned at each end of the valve spool.

FIG. 3 illustrates valve housing 1 modified to include a second drive chamber 12' with a second piston 11' in place of return spring 14. FIG. 4 illustrates a further modification wherein both first drive chamber 12 and second drive chamber 12' include a drive spring 14' and 14", respectively biased against first position 11 and second piston 11'.

The invention is not limited by the embodiments described above which are presented as examples only but can be modified in various ways within the scope of protection defined by the appended patent claims.

What is claimed is:

1. A multiway valve for switching the fluid flow of a pressure medium comprising:

a valve housing (1) with several ports (2a, 2b, 3a, 3b, 4a, 4b) is slidingly disposed, and which comprises at least one cap element (7a, 7b) for sealing said valve hole (5) on at least one end side, at least one piston (11) for axially moving said valve spool (6) in a desired switching position which corresponds with a drive chamber (12) having an inner diameter formed in the end section of the valve hole (5) to and from which a control fluid is supplied and ejected respectively in order to move said piston (11), characterized in that said at least one cap element (7a, 7b) having an outer diameter comprises at least one through bore (18a, 18b; 25) which in the mounted state of the cap element (7a, 7b) is substantially disposed in a right angle to the axis of the valve hole (6)

wherein said through bore (18a, 18b; 25) corresponds with a second through bore (18) in the valve housing (1) and also with a bore (19; 22) in a tight-fitting support element in order to fix the cap element (7a, 7b) to the valve housing (1) and to fix the valve housing (1) to the support element by the same fixing means.

2. A multiway valve according to claim 1, characterized in that the fixing means are at least one screw (21) which is screwed into the bore (22) of a tight-fitting support element.

3. A multiway valve according to claim 1, characterized in that the fixing means comprise screws (17a, 17b) which are disposed on the periphery of the cap element (7a, 7b) in order to fix the valve housing (1) on a tight-fitting support element.

4. A multiway valve according to claim 1, characterized in that the support element is a fluid manifold (20) of a valve bank for connecting the valve housing (1) with at least one of supplying and ejecting channels.

5. A multiway valve according to claim 1, characterized in that the support element is an upper port module (8) for connecting the valve housing (1) with pilot valves (9a, 9b).

6. A multiway valve according to claim 1, characterized in that a linking part (10) is disposed between a support element and a valve housing (1) and fixed by the fixing means.

7. A multiway valve according to claim 1 characterized in that a return spring (14) is biased against piston (11) for returning the valve spool (6) into the normal position when the drive chamber (12) is ejected from the control fluid in order to provide a mono-stable two-position valve function.

8. A multiway valve according to claim 7 characterized in that the drive chamber (12) and cap element (7b) form a spring chamber and the spring chamber (15) has the same form as the drive chamber (12) so that the return spring (14) is interchangeable by a further piston in order to change the valve function.

9. A multiway valve according to claim 1, characterized in that two drive chambers with corresponding pistons are disposed on both ends of the valve spool (6) in order to provide a bi-stable two-position valve function.

10. A multiway valve according to claim 1, characterized in that two return springs and two pistons are disposed on each end of the valve spool (6) which correspond with respective drive chambers in order to provide a mono-stable three-position valve function.

11. A multiway valve according to claim 1, characterized in that the cap element (7a, 7b) is provided with an annular sealing element (16a, 16b) disposed in a groove on the outer surface of the cap element (7a, 7b) in order to provide an air-tight sealing to the valve housing (1).

12. A multiway valve according to claim 1, characterized in that the outer diameter of the cap element (7a, 7b) is adapted to the inner diameter of the drive chamber (12).

* * * * *